(12) United States Patent
Hill (10) Patent No.: US 7,385,329 B2
(45) Date of Patent: Jun. 10, 2008

(54) ELECTRIC MACHINE FOR HIGH MAGNETIC REVERSAL FREQUENCIES

(76) Inventor: Wolfgang Hill, Ortenbergstrasse 3, 76135 Karlsruhe (DE)

( * ) Notice: Subject to any disclaimer, the term of this patent is extended or adjusted under 35 U.S.C. 154(b) by 211 days.

(21) Appl. No.: 10/378,325

(22) Filed: Mar. 4, 2003

(65) Prior Publication Data

US 2004/0174085 A1    Sep. 9, 2004

Related U.S. Application Data

(63) Continuation of application No. PCT/DE01/03373, filed on Aug. 31, 2001.

(51) Int. Cl.
  *H02K 21/00* (2006.01)
  *H02K 19/02* (2006.01)
  *H02K 1/06* (2006.01)

(52) U.S. Cl. .............. 310/162; 310/166; 310/254; 310/156.02; 310/156.41; 310/156.44; 310/216

(58) Field of Classification Search ............ 310/254, 310/179, 216, 112, 12, 156.38, 156.44–156.4, 310/13, 14
See application file for complete search history.

(56) References Cited

U.S. PATENT DOCUMENTS

| | | | | |
|---|---|---|---|---|
| 1,934,766 A * | 11/1933 | Krussmann | ............... | 310/112 |
| 3,437,854 A * | 4/1969 | Mitsuo | ............... | 310/254 |
| 3,509,390 A * | 4/1970 | Rachwal et al. | ............... | 310/15 |
| 3,585,423 A * | 6/1971 | Bolton et al | ............... | 310/13 |
| 3,770,995 A * | 11/1973 | Eastham et al. | ............... | 104/294 |
| 4,327,299 A * | 4/1982 | Goddijn | ............... | 310/112 |
| 4,355,249 A * | 10/1982 | Kenwell | ............... | 310/254 |
| 4,424,463 A * | 1/1984 | Musil | ............... | 310/49 R |
| 4,504,750 A * | 3/1985 | Onodera et al. | ............... | 310/12 |
| 4,983,870 A * | 1/1991 | McSparran | ............... | 310/90.5 |
| 5,010,262 A * | 4/1991 | Nakagawa et al. | ............... | 310/12 |
| 5,128,575 A * | 7/1992 | Heidelberg et al. | ..... | 310/156.41 |
| 5,218,250 A * | 6/1993 | Nakagawa | ............... | 310/12 |
| 5,633,551 A * | 5/1997 | Weh | ............... | 310/266 |
| 6,710,502 B2 * | 3/2004 | Maslov et al. | ............... | 310/254 |
| 6,836,035 B1 * | 12/2004 | Pawletko | ............... | 310/49 R |

* cited by examiner

FOREIGN PATENT DOCUMENTS

| | | | |
|---|---|---|---|
| GB | 2101816 A | * | 1/1983 |
| JP | 58165656 A | * | 9/1983 |
| JP | 03139159 A | * | 6/1991 |
| WO | 97/39515 | * | 10/1997 |

*Primary Examiner*—Burton Mullins (57) ABSTRACT

In electric machines, core losses limit, at high fundamental frequency, the permissible full-load power. The aim of the invention is to develop a design which enables a high power density at high magnetic reversal frequencies and which is easy to produce. To this end, the primary part comprises coils which, for the majority of their length, run in the direction of movement and which are surrounded in this area on three sides by soft magnetic material. In the direction of movement, at least two coils are arranged one behind the other. Coils of different phase are arranged perpendicular to the direction of movement inside different running tracks. In the secondary part, at least two oppositely magnetized hard magnets with three collector segments, which are flatly adjacent in a manner that is perpendicular to the direction of movement, form magnet poles having a high flux concentration. The primary and secondary parts can be shifted with regard to one another in a manner that is perpendicular to the direction of movement by means of a mechanism. The machine is characterized by having an easily producible modular design which has low core losses also at high frequencies. A high power density and, at the same time, a large low-loss field control area is realized in compact dimensions.

10 Claims, 10 Drawing Sheets

ELECTRIC MACHINE FOR HIGH MAGNETIC REVERSAL FREQUENCIES

This is a continuation of PCT/DE01/03373, filed on Aug. 31, 2001 with priority of the German application 100 43 120.8, filed on Aug. 31, 2000, now abandoned.

BACKGROUND OF THE INVENTION

1. Field of the Invention

The invention concerns an electric machine with at least one primary part and at least one secondary part, in which the secondary part is moveable in relation to the primary part by the force of magnetic fields.

2. Description of Prior Art

Electric machines with high rpms, or if configured as linear direct drives, with high speeds of movement of primary parts in relation to secondary parts, are characterized by high power densities. In such machines, considerable losses are generated in the soft magnetic body.

If, besides high top speeds, large forces are required, a high peak output ($P = v \cdot F$) is the result. It is known to reduce this peak output by means of field weakening at high rpms. Induction machines permit a simple realization of field weakening, however, in a full exciter field they achieve only approximately 70% of the surface thrust density of permanent magnet machines. On the other hand, the field regulating range in permanent magnet machines is limited and causes either considerable losses due to high field weakening currents in the primary part or requires an expensively constructed, hybrid excited secondary part.

From DE 28 02 753 C2 a synchronous machine with a magnetic field parallel to its axis is known, the soft magnetic body of which can consist of magnetic powder with an added binding agent. By turning two disk-shaped multiple pole multiple phase windings in opposite direction to each other in circumferential direction, weakening of the field is achieved.

From DE 41 37 457 C1 a permanent magnet generator is known, in which voltage is regulated by means of an adjustable screen made of a magnetically conducting material.

In DE 44 26 241 C2 an electric machine with permanent magnets in a collector arrangement is described, which is characterized by the configuration of its glue points.

In DE 35 36 583 A1 a transverse flux machine with permanent excitation is described, in which the winding consists of coils that utilize only a fraction of the circumference of the machine. Several soft iron elements are arranged within the coils with recesses between the soft iron elements at the air gap, the width of said recesses in direction of movement corresponding approximately to the width of the soft iron elements. Return of current occurs on the outside of the soft iron elements so that only a small part of the conductor length is contributing to the generation of power.

The objective of the present invention is therefore, to advance an electric machine for high magnetic reversal frequencies in such a manner, that high power density is achieved concurrently with low losses and that production expenditures remain low.

SUMMARY OF THE INVENTION

According to the present invention, this objective is achieved by the following characteristics. According to the invention, this electric machine consists of at least one secondary part and at least one primary part in which said secondary part and said primary part are separated by an air gap and are moveable in relation to each other in the direction of movement. Magnetic forces generate a thrust in the direction of movement. Said at least one primary part contains a winding and soft magnetic material in which said soft magnetic material conducts the magnetic flux transversally around partial areas of the winding. The winding consists preferably of prefabricated coils which, in the projection towards the air gap, are of a nearly rectangular shape and which do not overlap. Coils of different phases are arranged side by side perpendicular to the direction of movement, and in one variant, are set off in relation to each other in direction of movement. Alternatively, the poles which in the secondary part are arranged perpendicularly to the direction of movement are set off in relation to each other in the direction of movement.

In the projection towards the air gap, each coil with its surrounding soft magnetic body constitutes a middle pole in the center of the coil and two lateral poles which are arranged to the right and to the left of the coil perpendicularly to the direction of movement. The lateral poles possess in the direction of movement only one half the width of the middle pole. The dimension of the middle pole in the direction of movement is larger than it is perpendicularly to the direction of movement.

The current in the coils, which in a running track lie sequentially behind one another in the direction of movement, generates different magnetic fields in the middle poles which are arranged sequentially within a running track. The number of coils per running track corresponds to the number of poles of the machine. The number of running tracks corresponds to the number of phases or a multiple thereof. If the machine possesses two or more running tracks per phase, the arrangement of said running tracks perpendicular to the direction of movement, directly side by side, is preferable.

The dimension of the coils and the poles of the secondary part in the direction of movement is 2 to 30 times larger than said dimension perpendicular to the direction of movement. Those parts of the coil that are arranged in part or completely perpendicular to the direction of movement can not contribute optimally to the generation of force. They constitute the ineffective portion of the conductor which preferably amounts to only 3 to 30%.

In a rotating machine, the winding may alternatively consist of conductor rings, the conductors of which are arranged largely parallel to the direction of movement, and, after a pole pitch, a partial area of said conductors lies perpendicular to the direction of movement, the length of said partial area corresponding to the sum of coil width and tooth width.

For high space factors, the coils are preferably prefabricated from profile wire in a device. The high effective conductor portion and the high space factor result in low ohmic losses.

Another significant advantage of the present invention are low losses in the soft magnetic body. Due to the small dimension of the coil perpendicular to the direction of movement short flux paths are generated in relation to the size of the machine or to the air gap surface. The portion of the soft magnetic material on the side of the coils that is facing away from the air gap (yoke area) can be kept small. Thus, electric machines can be realized that have small dimensions in direction to the air gap and can be designed "thin". A high ratio of the air gap surface to the effective design volume increases power density. Short flux paths and thus a small soft magnetic mass in relation to power lower magnetic losses.

Additionally, the design permits the utilization of particularly low-loss soft magnetic materials. In one of the embodiments comb-shaped sheet of grain-oriented material is being used. In another embodiment, C-cores of amorphous strip are inserted into the coils from the side facing away from the air gap. At high frequencies, the amorphous material has only a fraction of the losses of crystalline electric sheet machine from a multitude of identical C-cores. The C-cores can consist also of other low-loss soft magnetic strips—e.g. nanocrystalline alloys based on nickel, iron or cobalt. Punching dies are not needed and there is no punching waste. The soft magnetic body is assembled by a pick-and-place machine from a multitude of identical C-cores. The C-cores can consist also of other low-loss soft magnetic strips—e.g. nanocrystalline alloys based on nickel, iron or cobalt.

In accordance with the invention, the magnetic flux in the secondary part runs also perpendicular to the direction of movement. Independent of the method of the conductor return in the primary part, the power density and efficiency of the machine at like stator volume is improved by an increase in air gap flux density. According to the invention, flux concentration is generated by the arrangement of at least two oppositely magnetized permanent magnets arranged sequentially behind one another perpendicular to the direction of movement, wherein each permanent magnet lies perpendicular to the direction of movement between collector segments, and collector segments of different polarity are arranged in sequence in direction of movement. The soft magnetic body is well utilized by the air gap flux density achieving 1.4 to 2.3 T in the area of the tooth ends.

The ratio of the sum of the two contact surfaces of the collector segment with the permanent magnets to the surface of the collector segment at the air gap corresponds to the concentration factor for the magnetic flux. At a predetermined pole length in direction of movement, the width of the pole surface at the air gap can be chosen arbitrarily. Thus, the desired concentration factor can be achieved independent from the number of poles and the dimension of the secondary part in direction to movement.

In one variant, the magnetic poles of the secondary part, which consist either of air gap magnets or of collector segments, have with reference to the poles of the primary part an overhang perpendicular to the direction of movement. The overhang also effects a flux concentration.

Another basic idea of the present invention is the mechanical field weakening of an electric machine that is excited by permanent magnets by shifting the primary part and the secondary part against each other perpendicularly to the direction of movement while the mechanical air gap remains constant. This shifting operation becomes particularly effective by subdividing the air gap surfaces into zones with different magnetic effect which lie perpendicular to the direction of movement and which are smaller by a multiple than the secondary part or the primary part. Magnetic poles with preferably opposite polarity are arranged at the air gap surface perpendicular to the direction of movement, and these poles are separated by magnetically inactive pole gaps.

By a shift perpendicular to the direction of movement, the overlap of the pole surfaces of the secondary part and the primary part, which are oriented towards each other, is decreased. Parts of the magnetic flux must travel a longer distance in the air gap. The magnetic resistance of the magnetic circuit increases and flux is weakened. Additionally, leakage paths are generated for the flux, which do not lead around the conductors of the winding. Both effects can nearly completely reduce the effective magnetic flux.

The same effect results, if the magnetic pole surface has soft magnetic toothing perpendicular to the direction of movement. At maximum magnetic flux the teeth are oriented towards each other. By a shift perpendicular to the direction of movement the magnetic resistance of the magnetic circuit increases and flux is weakened.

For a shift perpendicular to the direction of movement, that force that tries to keep the resistance in the magnetic circuit low is to be surmounted. Since this force is also operating when the machine is stopped, actuators by which the shifted positions can be maintained free of energy are preferable.

Preferably, the stationary part, i.e. in most cases the primary part, is shifted with reference to the housing or, respectively, the bearing seats. The movable part is connected to the housing via slideways which absorb the forces in direction of movement and in direction towards the air gap. Large contact surfaces and a heat conducting paste or a cooling system that is integrated in the movable part ensure heat dissipation into the housing. In an advantageous embodiment the movable part consists of two equally large halves which are shifted by an actuator from the preferred position into opposite directions. By this operation, the shift forces and the bearings are relieved.

All three approaches to a solution of the present invention are based on the division of the air gap surface into magnetically active zones with large dimensions in direction of movement and small dimensions perpendicular to the direction of movement and which divide the air gap surface in a checkerboard fashion. Each of the three solution approaches provides an independent contribution to the increase of power and minimization of losses in electric machines for high cyclic magnetization frequencies.

The present invention is applicable to linear drives as well as to rotary drives with radial or axial direction of flux in the air gap. The three main dimensions (axes of coordinates) of the machine are referenced as "direction of movement," "direction towards the air gap," and "perpendicular to the direction of movement" since these three descriptions are applicable to all relevant machine types. Additionally, the invention includes, besides permanent excited machines, also machines in accordance with the reluctance principle, in which the poles are formed by alternating soft magnetic teeth and recesses in direction of movement.

BRIEF DESCRIPTION OF THE DRAWINGS

The drawings show advantageous embodiments of the invention.

DETAILED DESCRIPTION OF THE PREFERRED EMBODIMENT

Figure 1:
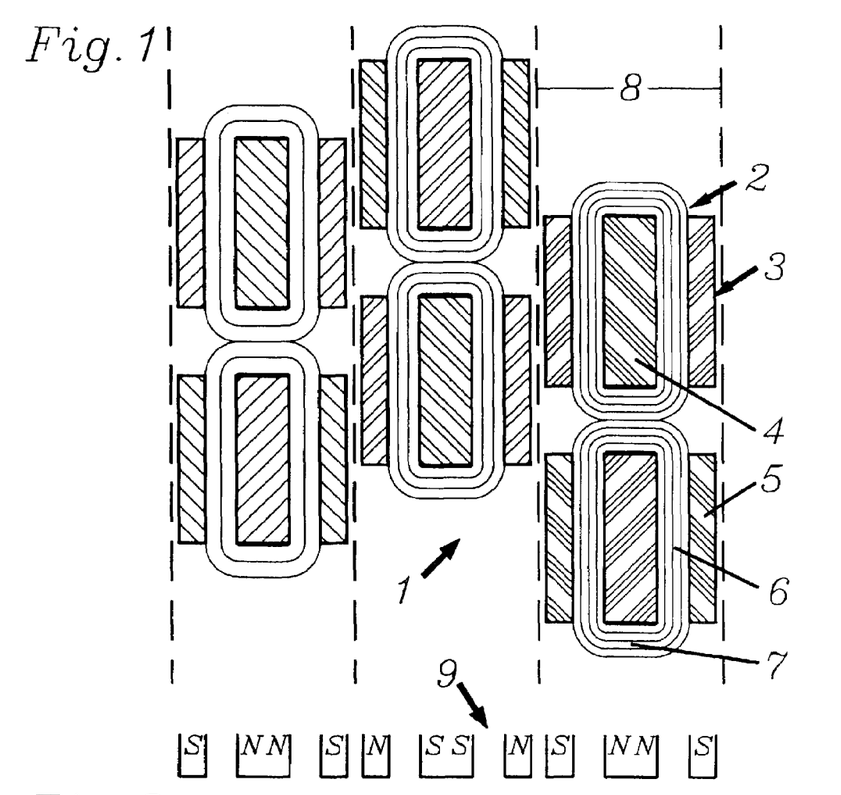
FIG. 1 shows a three-phase primary part with six set off coils in a view in direction to the air gap.

FIG. 1 shows the construction of the electromagnetically active parts of a primary part (1) in accordance with the invention in a view onto the air gap surface. Six rectangular coils (2), each embedded in E-shaped soft magnetic bodies (3), constitute an electric pole unit which consists of a middle pole (4) and two lateral poles (5). The partial areas (6) of the coils (2) positioned in direction of movement (vertical in the drawing) have a distinctly larger dimension than the partial areas (7) positioned perpendicular to the direction of movement (horizontal in the drawing). Two coils or, respectively, electric pole units arranged sequentially in direction of movement lie in a running track (8) and belong to the same phase. The offset between the three phases is realized in the primary part.

Figure 2:
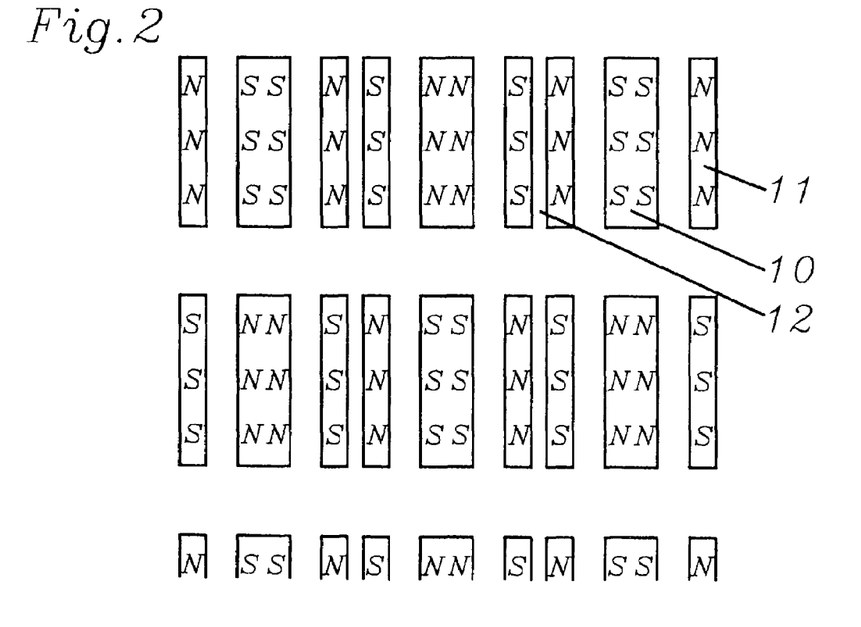
FIG. 2 shows a section of the secondary part from FIG. 1 with 3 pole pitches in direction of movement in a view in direction to the air gap.

In FIG. 2 the associated secondary part (9) is shown. Since the phase offset is already being realized in the primary part (1), the magnetic poles (10, 11) of the secondary part form rows perpendicular to the direction of movement. Poles arranged sequentially in direction of movement have opposite polarity. As in the primary part, middle poles (10) lie perpendicular to the direction of movement between lateral poles (11) that are half as wide as the middle poles. Between adjacent lateral poles (11) perpendicular to the direction of movement is a void (12) with low magnetic conductivity in order to prevent leakage flows across the offset soft magnetic bodies of the primary part. In a large void (12), polarity may be opposite. Otherwise, adjacent lateral poles (11) are preferably of the same polarity.

Figure 3:
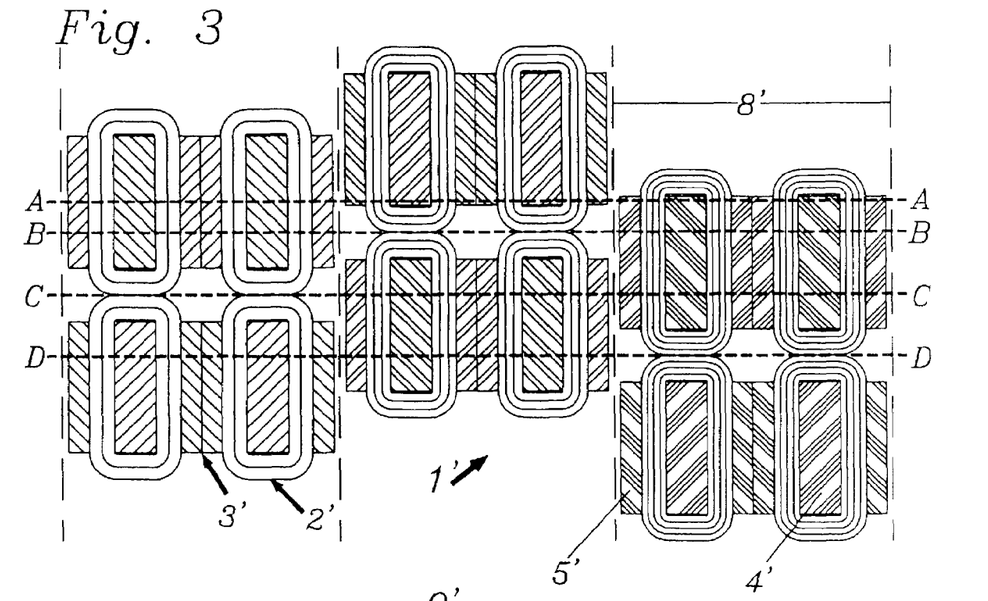
FIG. 3 shows a three-phase primary part with twelve set off coils in a view in direction to the air gap.

FIG. 3 shows an air gap view of a three-phase primary part (1') with twelve coils in six running tracks. Two running tracks (8') each of a phase are arranged side by side and the lateral poles (5') of the electric pole units abutting perpendicular to the direction of movement constitute together a pole which corresponds to a middle pole (4'). Soft magnetic bodies (3') of different phases show a space between each other perpendicular to the direction of movement.

Figure 4:
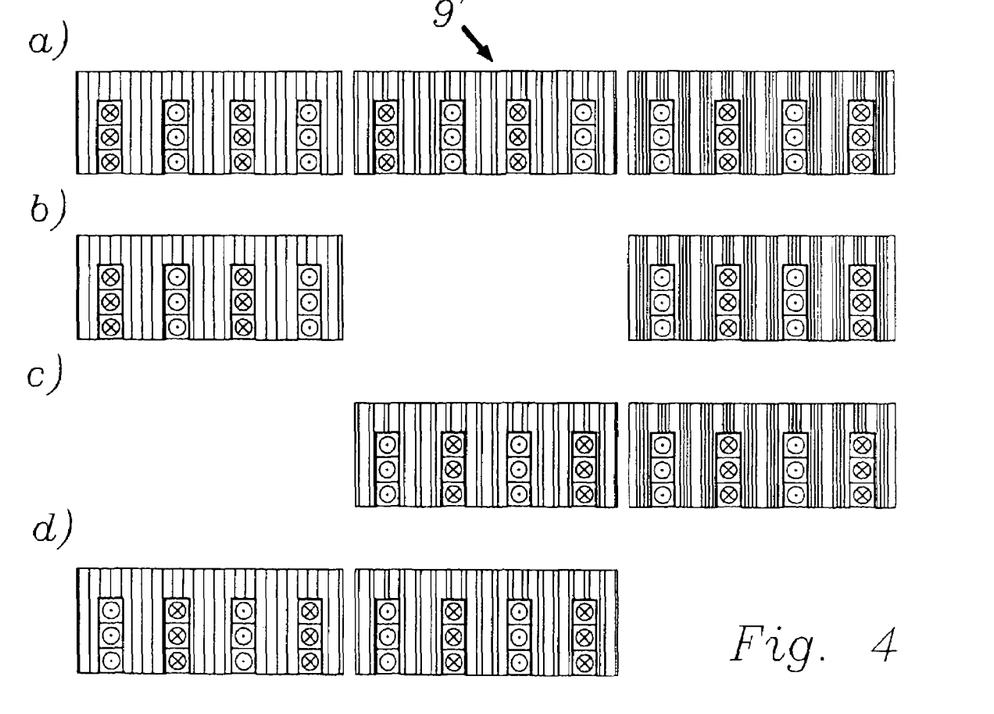
FIG. 4 shows four cross sections through the primary part from FIG. 3.

In FIG. 4 are shown cross cuts through the electromagnetically active components of the primary part (1') of FIG. 3 at the cut lines A-A to D-D. In cross cut a) the soft magnetic bodies (3') of all three phases can be seen. The coils (2') of a phase abutting perpendicular to the direction of movement carry the same current. The cut lines B-B, C-C, and D-D are placed such that each is lying in the split between the coil end heads of a phase and thus, this phase does not appear in the depiction of the cross cut.

Figure 5:
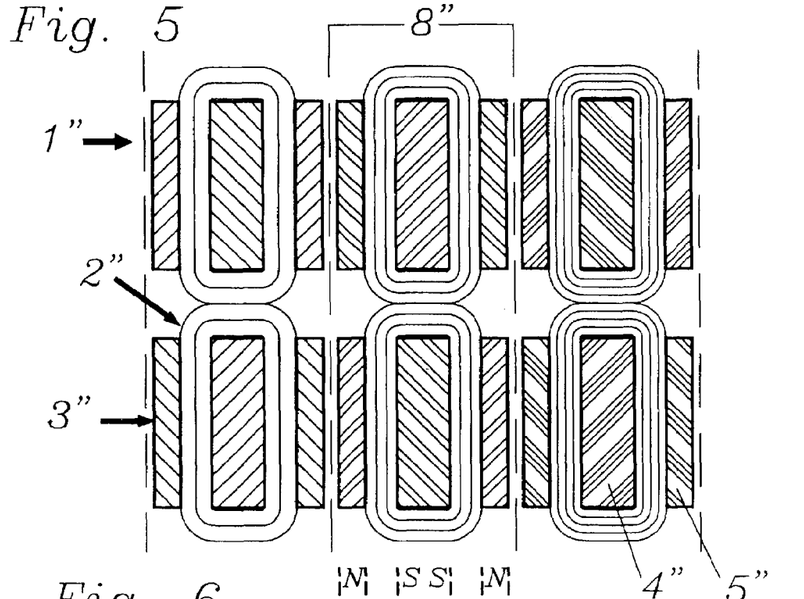
FIG. 5 shows a three-phase primary part with six coils in a view onto the air gap surface.
Figure 6:
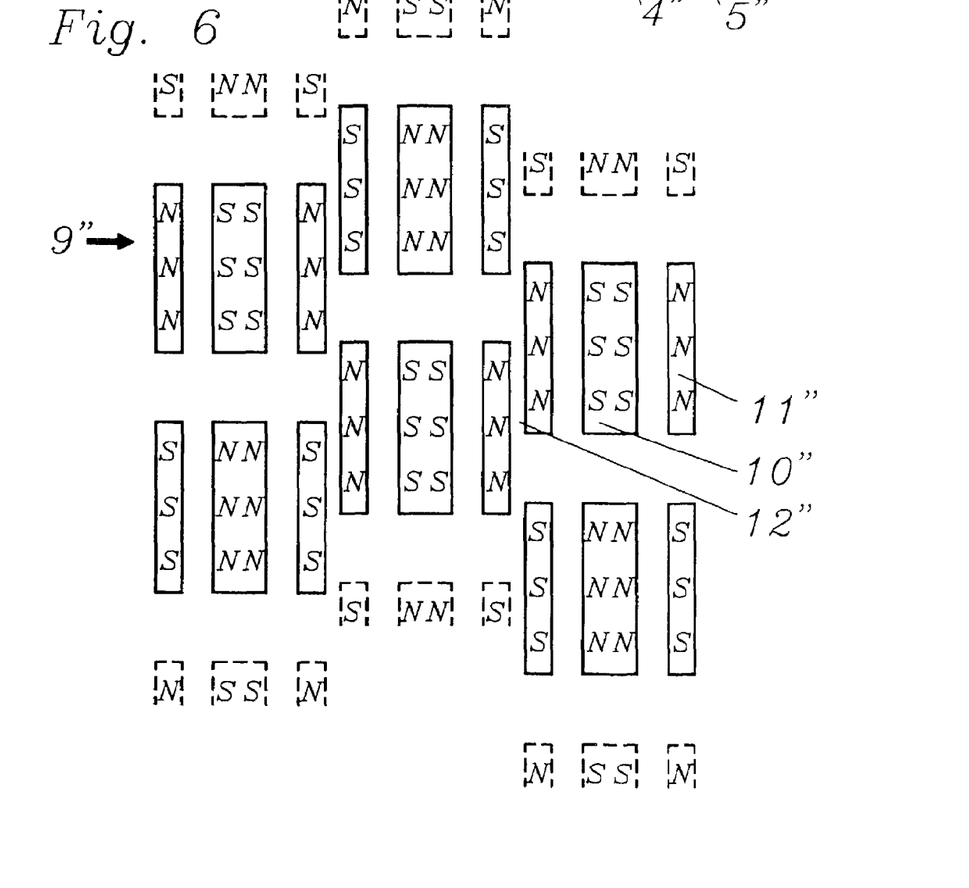
FIG. 6 shows a section of the secondary part shown in FIG. 5 with three pole pitches set off in direction of movement in a view onto the air gap surface.

Analogous to the first two figures, FIG. 5 and FIG. 6 show a three-phase primary part (1") with six coils (2") and its associated secondary part (9"), in which the phase offset is realized in the secondary part. Coils (2") of different phases lie perpendicularly to the direction of movement without offset adjacent to each other. On the other hand, permanent magnets arranged in the running tracks (8") in the secondary part (9") show an offset between the running tracks (8") which corresponds to one third of the pole pitch in direction of movement. Each running track (8") represents a one-phase system in which the electric poles of the primary part (1") act reciprocally with the poles of the secondary part (9"). In order to achieve optimal magnetic coupling in the one-phase system, the pole surfaces of the secondary part and the primary part largely correspond to each other at the air gap. The poles of the secondary part may also be soft magnetic teeth. The magnetic fields close within the running tracks (8") and the uncoupled one-phase systems may realize the phase offset either in the primary or the secondary part.

Figure 7:
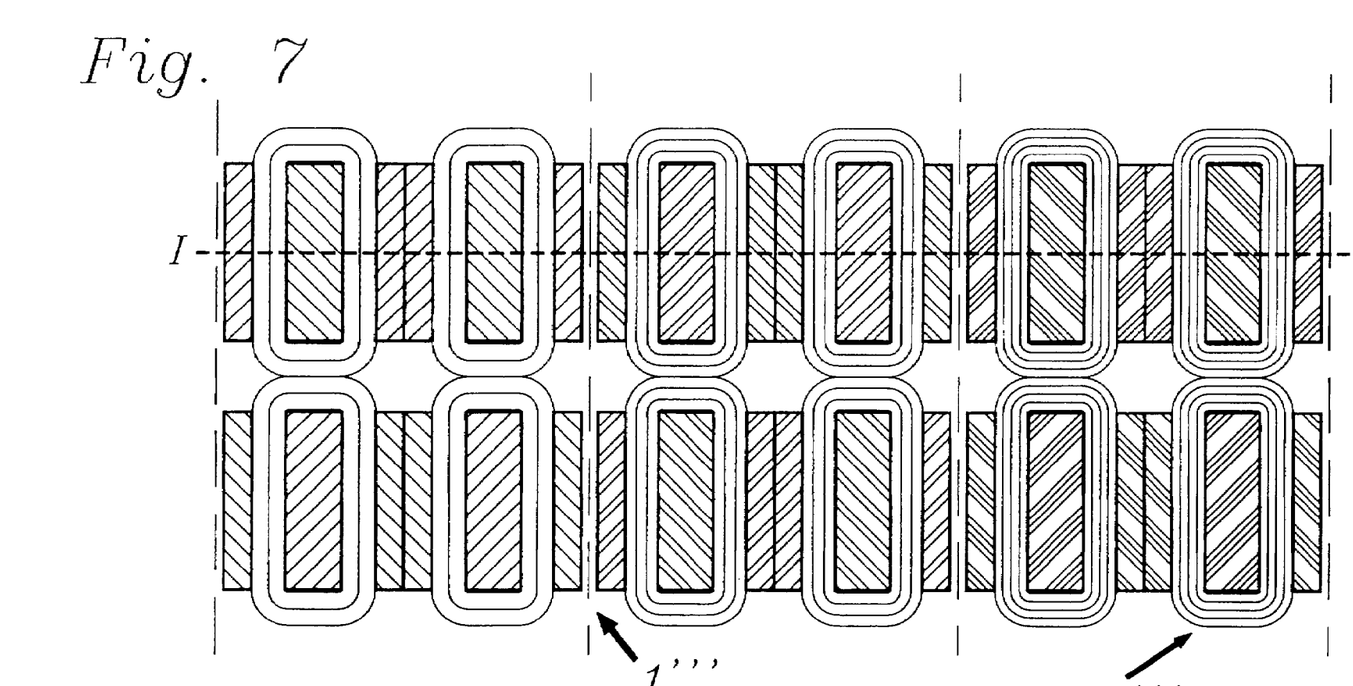
FIG. 7 shows a three-phase primary part with twelve coils in a view onto the air gap surface.

If the phase offset occurs only in the secondary part, the construction of the primary part will be simplified. FIG. 7 shows such a three-phase primary part (1''') with twelve coils (2'''). In order to enlarge the air gap surface perpendicular to the direction of movement, any number of tracks per phase may be arranged adjacent to each other. For this purpose, a parallel connection of primary parts in accordance with FIG. 5 is also possible, however, this enlarges the number of magnetically ineffective spaces between the tracks.

Figure 8:
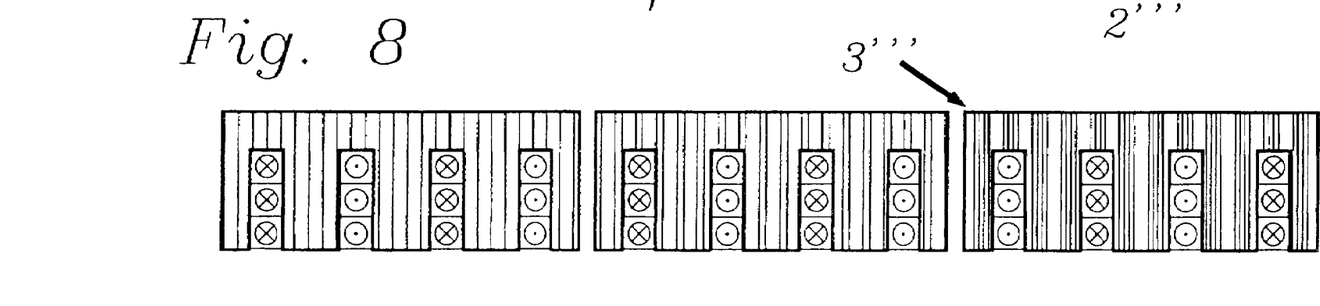
FIG. 8 shows a cross section of the primary part from FIG. 7.

If the soft magnetic bodies (3''')—as shown in FIG. 8—lie in a row perpendicular to the direction of movement, they can be inserted into a corresponding recess in the housing of the primary part. This is advantageous particularly in rotating machines, because the running tracks are closing in direction of movement and the assembly of the prefabricated electric pole units outside a cylindrical air gap is possible only from the side.

The air gap surfaces shown in FIG. 1 to FIG. 3 and FIG. 5 to FIG. 7 can be part of a linear direct drive as well as a layout of a rotating machine with cylindrical air gap. If the tracks are bent to the left or to the right with reference to the direction of movement, arched drives are obtained which, as soon as they combine to a full circle, can be described as axial flux machines. In a configuration as reluctance machine, the designations "N" for north pole and "S" for south pole are not applicable and the poles of the secondary part are designed as soft magnetic teeth whose distance from each other in direction of movement corresponds approximately to their length.

Figure 9:
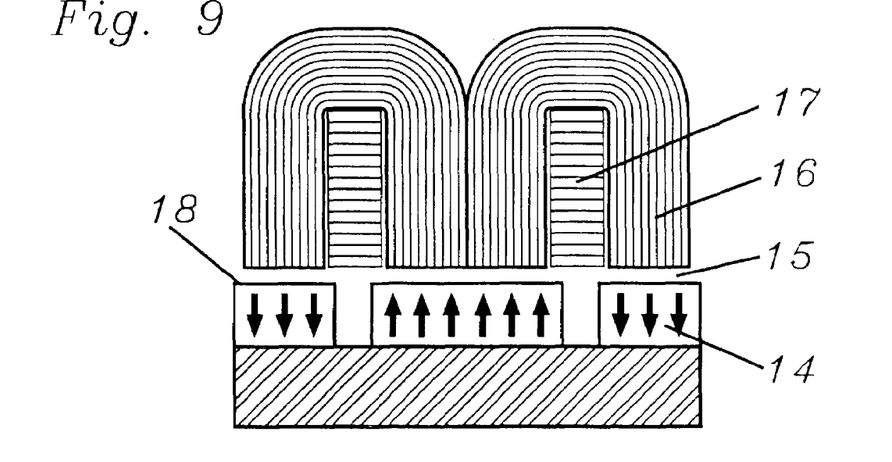
FIG. 9 shows the cross section of a pole unit with C-cores and air gap magnets of a neodymium alloy with overhang.
Figure 10:
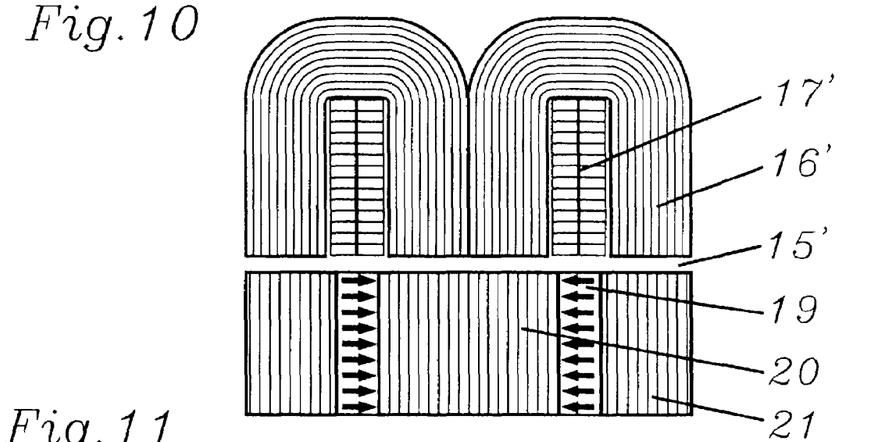
FIG. 10 shows the cross section of a pole unit with C-cores and permanent magnets of a neodymium alloy between collector segments made of electric sheet.
Figure 11:
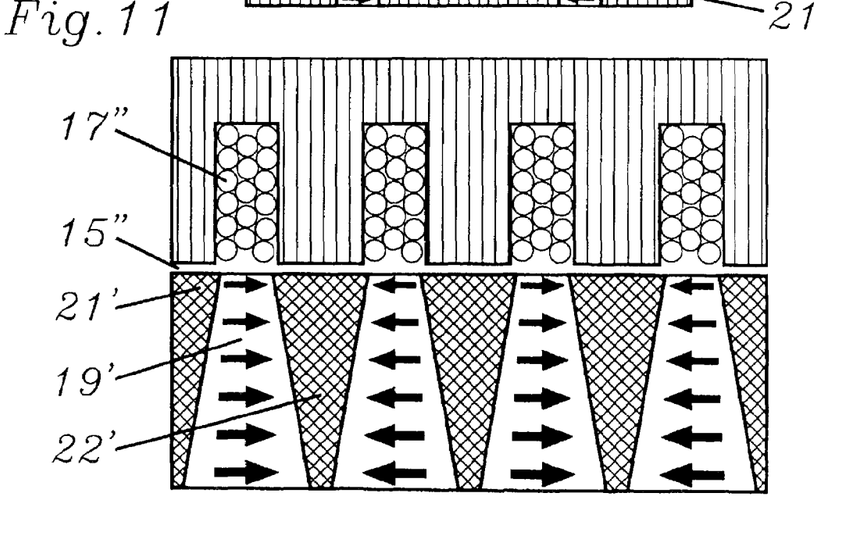
FIG. 11 shows the cross section of a pole unit with comb-shaped electric sheet and ferrite magnets between collector segments of iron powder.

For high power densities, secondary parts with permanent magnets are preferred. FIGS. 9 to 11 show three preferred variations. This present invention is, however, not limited to these variations.

Simple assembly allows placement of the permanent magnets (14) shown in FIG. 9 which are arranged at the air gap (15). Preferably utilized are earth magnets with a relatively large thickness towards the air gap. C-cores (16)

of thin strip with low losses at high frequencies lead the magnetic flux around the coil (17) made of profile wire. The permanent magnets (14) are wider perpendicular to the direction of movement than the pole surfaces of the C-cores. Preferably, the overhang (18) amounts to 0.5 to 2 times the air gap (15).

For higher power densities, soft magnetic materials are utilized that permit a higher magnetic flux density (1.5 to 2.3 T). These flux densities are realized by a collector arrangement of the permanent magnets (19)—as shown in FIG. 10. The flux density of magnetized permanent magnets (19) perpendicular to the direction of movement is concentrated towards the air gap in collector segments (20, 21). The ratio of the dimension of the magnets in direction towards the air gap (15') to the width of the lateral poles perpendicular to the direction of movement determines the factor of the magnetic flux concentration.

By means of narrow poles of the primary part perpendicular to the direction of movement the flux concentration factor can be increased freely and independent of the number of poles. In machines with a low number of poles also high air gap flux densities (up to 2.3 T) can be realized by using ferrite magnets. FIG. 11 shows a cross section with ferrite magnets (19') and collector segments (20'—in FIG. 10—, 21') of pressed iron powder. The width of the pressed iron powder parts decreases with increasing distance from the air gap (15") and the width of the ferrite magnets (19') increases correspondingly. The factor of flux concentration in FIG. 11 is approximately 5.

Figure 12:
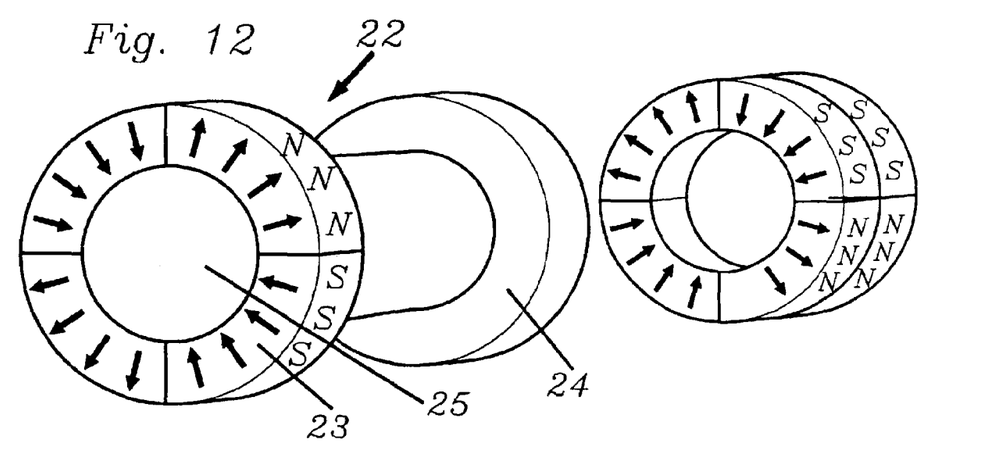
FIG. 12 shows an internal rotor with air gap magnets.

FIG. 12 shows the three-dimensional construction of a secondary part (22) rotating within a cylindrical air gap with air gap magnets (23) which, for high rotational speed, have been prefabricated as single-piece rings and have been multipolar magnetized in radial direction. The axial width of the magnet rings (23) corresponds to the width of the lateral poles plus overhang. The magnet poles arranged oppositely the middle poles consist of two of said magnet rings (23). Distance rings (24) of material of poor magnetic and electric conductivity are arranged between the oppositely magnetized lateral poles and middle poles of a running track and between the lateral poles of different running tracks. At the radially inner surfaces the magnetic rings (24) abut a bar (25) of soft magnetic material.

Figure 13:
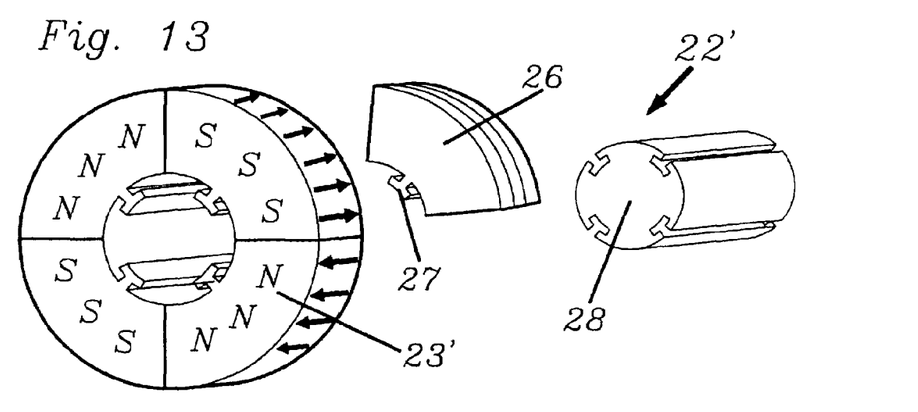
FIG. 13 shows an internal rotor with permanent magnets between collector segments.

FIG. 13 shows a secondary part (22') in which the magnetic rings (24') are multipolar magnetized in axial direction. They constitute together with the collector segments (26) of packed electric sheet a collector arrangement. The collector segments (26) arranged in sequence in circumferential direction are separated by a void between each other. This void decreases leakage flows either through the insulation material or through the magnets that are magnetized in direction of the circumference. The collector segments (26) and the magnet rings (24') are positioned and fixed by teeth (27, 27') that protrude radially into the inside. For this purpose, the profile bar (28) which is made preferably of unmagnetized steel is fitted with corresponding T-grooves.

Figure 14:
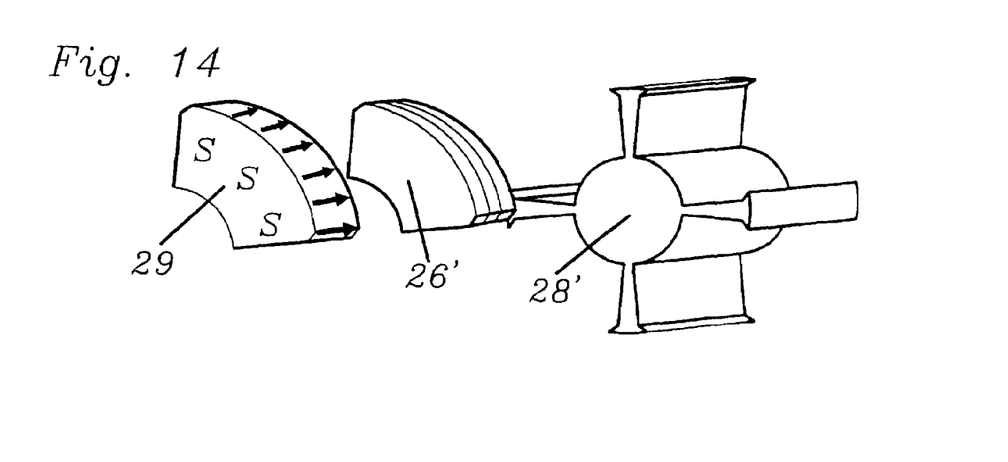
FIG. 14 shows a variant of the configuration of an internal rotor with permanent magnets between collector segments.

In an alternative design—FIG. 14—the permanent magnet (29) also is divided into segments in direction of the movement in accordance with the number of poles. The permanent magnets together with the soft magnetic collector segments (26') are inserted axially into a profile bar (28') made of non-magnetic and insulating material.

Figure 15:
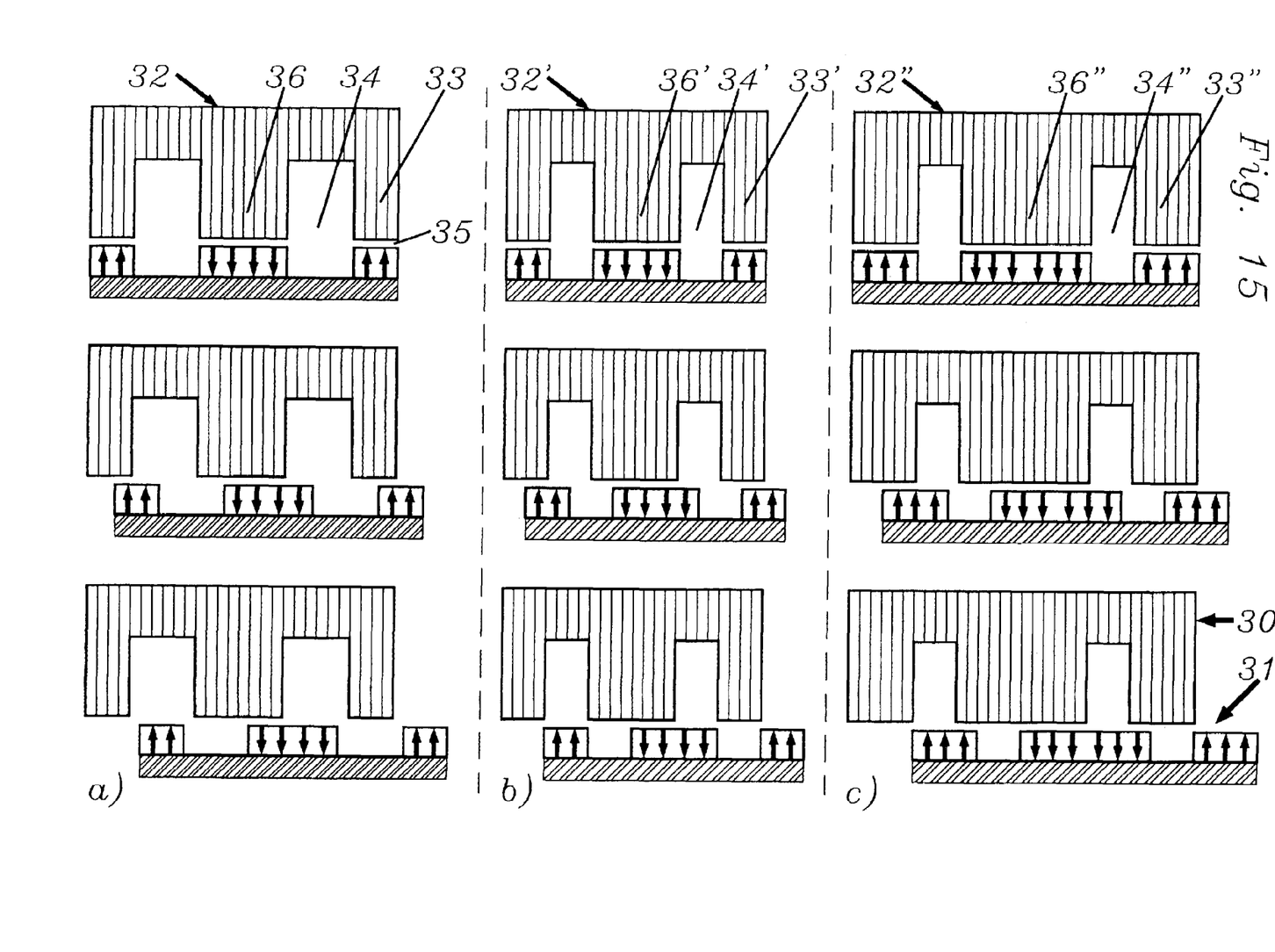
FIG. 15 shows the cross section of a pole unit with the associated secondary part cutout at a non-weakened field at one half the regulating distance and at full regulating distance in three variants.

FIG. 15 shows the effect of weakening of the field by offset of the primary part (30) relative to the secondary part (31) for three configurations of packed electric sheet (32, 32', 32") with different ratios of the widths from lateral pole (33, 33', 33") to groove (34, 34', 34"). In variant a), the width of a lateral pole (33) is smaller than the width of the groove (34). In variant b), both widths are equal, and in variant c), the lateral poles (33") are wider than the grooves (34"). In the top row, the pole surfaces of the primary and the secondary part lie completely opposite each other and magnetic resistance is minimal. In the middle row, the parts are arranged offset by half the shift perpendicular to the direction of movement and approximately one half of the magnetic field lines have to surmount a longer path in the air gap (35). Magnetic resistance in the magnetic circuit increases and the field is being weakened. In the lower row, magnetic resistance is highest. Additionally there is increased generation of leakage fields through the tooth heads of the middle pole (36, 36', 36"). The ratio of groove width to pole width affects not so much the amount of field weakening but rather the share of the leakage flows in the field weakening.

Figure 16:
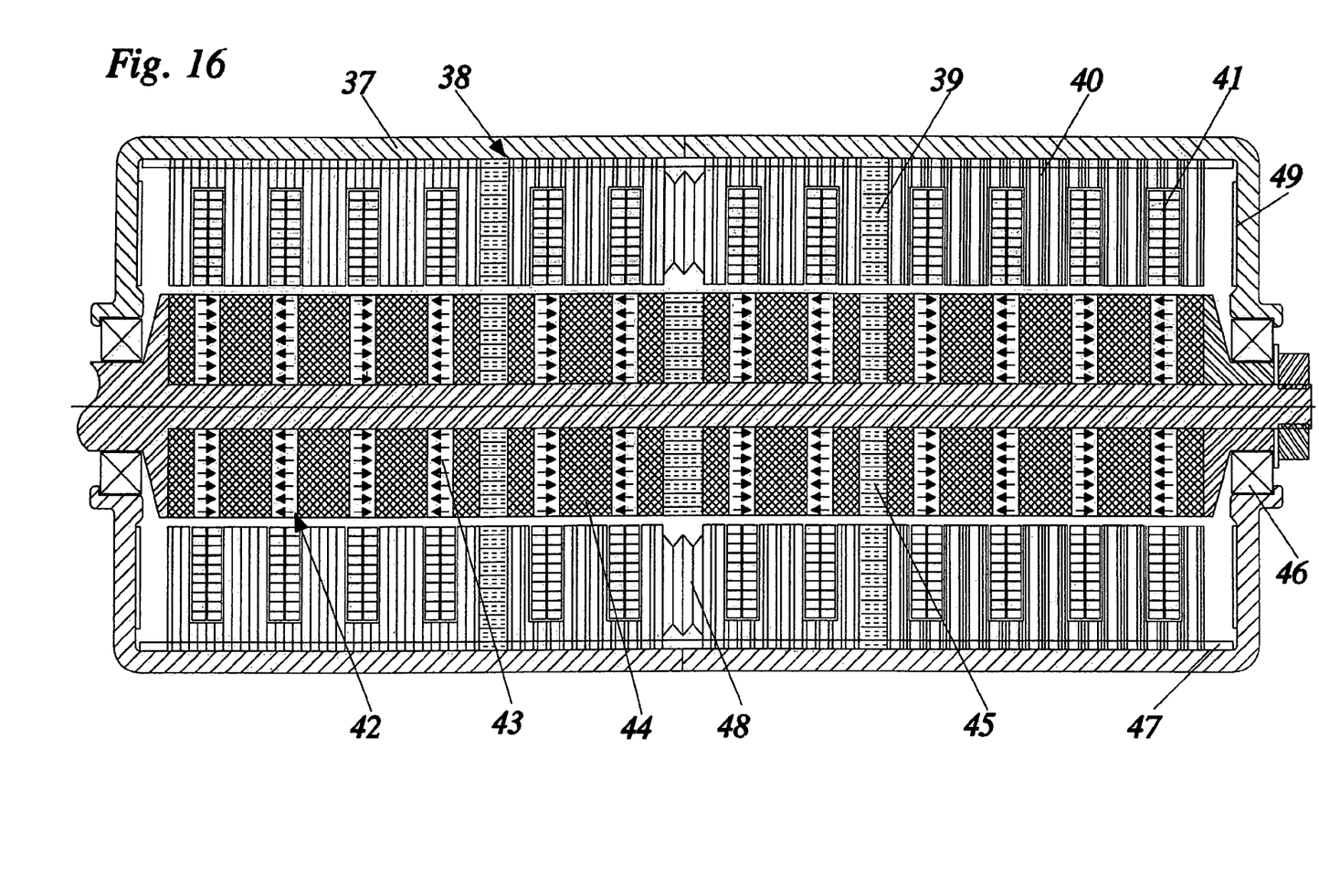
FIG. 16 shows the longitudinal cut of a three-phase machine with a piezo-ceramic actuator.

A rotating three-phase machine embodying all three approaches to a solution of the present invention is shown in FIG. 16. Within the housing (37), the primary part (38) is axially divided into three identical sections which are separated by ceramic discs (39). Each of these sections consists of a comb-shaped soft magnetic body (40) in the grooves of which are imbedded coils (41) of wound profile wire. The coils in a groove extend tangentially only over a part of the circumference. The secondary part (42) consists of axially magnetized neodymium magnets (43) between soft magnetic collector segments (44). In the secondary part also three identical sections are divided by insulating discs (45). The rotor is axially fixed with reference to the housing (37) by means of two bearings (46) and the primary part (38) is axially moveably with reference to the housing by means of a slideway (47). Piezo-ceramic linear actuators serve as regulating drive (48). Alternatively, pneumatic or hydraulic cylinders or electro-mechanic drives may be utilized. A limit stop (49) limits the regulating distance to a length where the magnetic forces act against the excursion.

Figure 17:
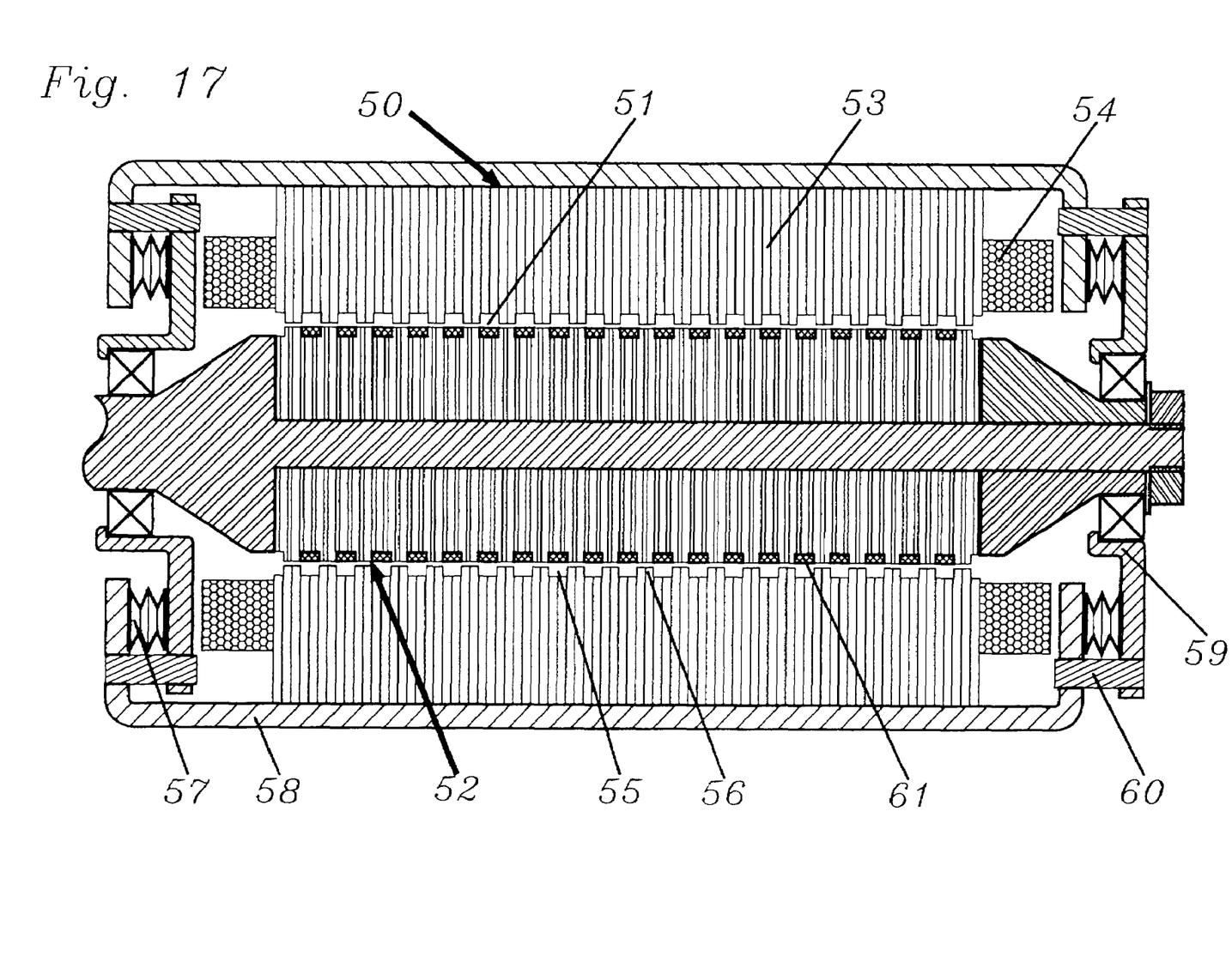
FIG. 17 shows the longitudinal cut of a machine with conventional winding and toothing of the pole surface perpendicular to the direction of movement.

The field weakening in accordance with the present invention can also be realized in conventionally wound primary parts (50), if the air gap perpendicular to the direction of movement has teeth on both sides. Such a machine is shown in FIG. 17. The rotating secondary part (52) has permanent magnets embedded in an electric sheet packet (53) which are not visible in the rotor position shown. The primary part (50) has grooves parallel to the axle in which are arranged coils (54) with a concentrated or distributed winding. The electric sheet packet of the primary part (50) as well as the electric sheet packet (53) of the secondary part (52) are assembled from two different punch cuts in which the punch cuts have different inner and/or outer radii. After assembling of the sheets into packets, both packets have grooves (55) in the air gap surface in direction of movement. In a fully magnetic field the ribs (56) of the primary part and the secondary part are oriented towards each other. The housing (58) with the primary part (50) can be axially shifted with reference to the bearing seats (59, 59') by two annular regulating drives (57). Guide pins (60) transmit the torque. At maximum regulating path, the ribs (56) lie radially opposite the grooves (55). By an increase of magnetic resistance the energizing field is weakened accordingly. Binding rings (61) are arranged in the grooves of the rotor.

Figure 18:
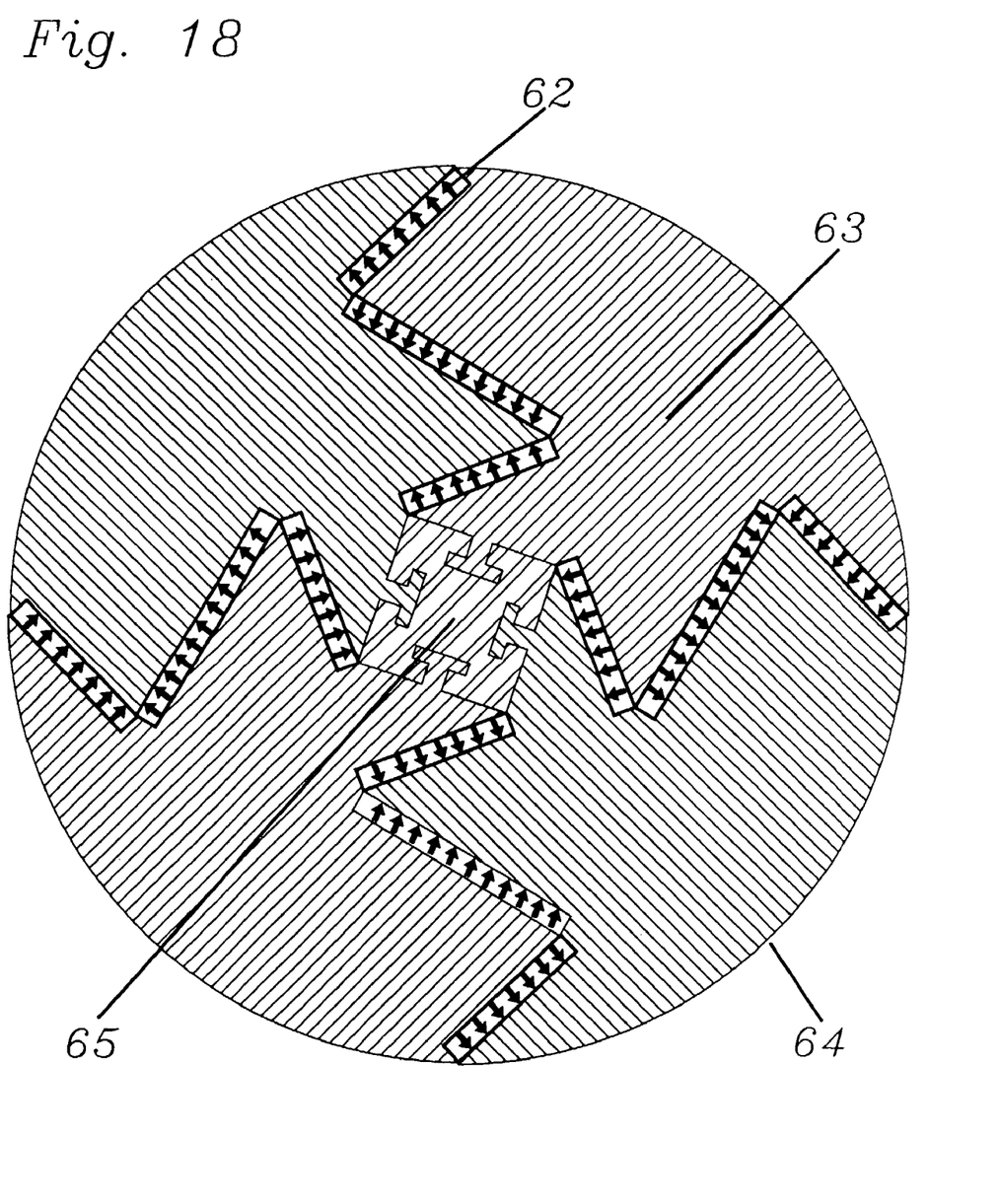
FIG. 18 shows the cross cut of a four-pole rotor for the machine of FIG. 17 with countersunk permanent magnets and flux concentration.

FIG. 18 shows the cross section of the secondary part (52) from FIG. 17. The electric sheet packets are separated by block-shaped permanent magnets (62) into four identical sector cuts (63) which form in radial direction towards the outside at the air gap surface (64) magnetic poles with alternating polarity in direction of the circumference. The block-shaped permanent magnets form a radially arranged zig-zag-line from the pole boundary to the center of the shaft (65). Thereby, the active surface of the permanent magnets (62) is increased relative to the air gap surface of the poles. If the ratio is >1, flux density to the air gap (51 in FIG. 17) increases. By increasing the size of the surface, the operating point in the magnet is lowered into a larger energy product range and, at approximately equal magnet costs, power density of the machine is increased.

What I claim is:

1. Electric machine with at least one primary part and at least one secondary part, said secondary part and said primary part being movable with respect to each other by the force of magnetic fields, with an air gap that is arranged between said primary part and said secondary part, said machine being a synchronous machine with permanent excited poles or in accordance with the reluctance principle, said secondary part has poles with a pole pitch in direction of movement, and said primary part has coils made of a conductive material, said coils lying partially in at least one soft magnetic body which together form primary part poles, and the magnetic flux in said primary part and in said secondary part flowing predominantly transversally to the direction of movement, said primay part poles and said secondary part poles having extensions in direction of movement, and said primary part poles and said secondary part poles having extensions perpendicular to the direction of movement, wherein said extensions perpendicular to the direction of movement are shorter in relation to said extensions in direction of movement, said primary part poles act reciprocally with the poles of said secondary part in running tracks, said primary part poles and said secondary part poles are arranged alternately in direction of movement within a running track, and at least two of said running tracks are arranged side by side perpendicular to the direction of movement.

2. Electric machine in accordance with claim 1, wherein partial areas of said coils are disposed in the direction of movement, and partial areas of said coils are disposed perpendicular to the direction of movement, the dimension of said partial areas of said coils disposed in the direction of movement corresponds approximately to said pole pitch of said secondary part poles and the predominant part of the partial areas disposed in the direction of movement are enclosed on three sides by at least one soft magnetic body, said soft magnetic body forming primary part poles at the air gap surface, and the partial areas of said coils disposed perpendicular to the direction of movement have approximately the same distance to the air gap as the partial areas disposed in the direction of movement.

3. Electric machine in accordance with claim 1, wherein said coils in said primary part have two partial areas in the direction of movement, and C-cores of amorphous or nanocrystalline soft magnetic strip enclose at least partially said two partial areas in the direction of movement of said coils from three sides.

4. Electric machine in accordance with claim 1, wherein said electric machine is a rotary device having a number of poles, a number of phases, and a number of running tracks, in at least one of said running tracks a number of coils is arranged in the direction of movement behind one another, said number of coils per running track corresponding to said number of poles of said electric machine, and said number of running tracks, which are arranged perpendicular to the direction of movement corresponds to the number of phases or a multiple thereof.

5. Electric machine in accordance with claim 1, wherein in said secondary part, approximately perpendicular to the direction of movement, magnetized permanent magnets are separated perpendicularly to the direction of movement by soft magnetic collector segments, said separated permanent magnets having opposite polarity.

6. Electric machine in accordance with claim 5,
  wherein at least two said collector segments are arranged sequentially in the direction of movement and are separated by magnetic material with poor magnetic conductivity or permanent magnets that act as pole screen, said collector segments arranged sequentially in the direction of movement forming poles of different polarity towards said air gap.

7. Electric machine in accordance with claim 5,
  wherein the length of said collector segments in the direction of movement is larger than their width perpendicular to the direction of movement, and said collector segments consist of pressed or sintered soft magnetic powder, and the cross section of said collector segments in their projection to said air gap decreases with increasing distance from said air gap.

8. Electric machine in accordance with claim 5,
  wherein two structural sizes of said collector segments having a different width perpendicular to the direction of movement are arranged in said secondary part, the width of the smaller said collector segment at said air gap corresponding approximately to one half the width of the larger said collector segment, and in the direction of movement sequentially arranged smaller said collector segments form the edge of a running track within which perpendicular to the direction of movement said permanent magnets and said collector segments are abutting each other.

9. Electric machine accordance with claim 1, wherein within said primary part and said secondary part, perpendicular to the direction of movement, zones of different magnetic resistance are alternatingly arranged for the magnetic flux, and at least one said primary part or said secondary part can be shifted against the other perpendicular to the direction of movement.

10. Electric machine in accordance with claim 9,
  wherein one of said shiftable parts is held by at least one slideway in direction of movement and in direction to the air gap surface of said primary part, said shiftable part consisting of two halves which are shifted simultaneously by a regulating drive into opposite directions from their preferred positions, said shiftable parts have a surface to said air gap with said zones of different magnetic resistance, said zones having a minimum width, the maximum distance of shift corresponding to said minimum zone width perpendicular to the direction of movement.

* * * * *